(12) United States Patent
Elliott

(10) Patent No.: US 7,158,803 B1
(45) Date of Patent: Jan. 2, 2007

(54) EMERGENCY SERVICES FOR WIRELESS DATA ACCESS NETWORKS

(75) Inventor: Brig Barnum Elliott, Arlington, MA (US)

(73) Assignees: Verizon Corporate Services Group Inc., New York, NY (US); BBN Technologies Gorp., Cambridge, MA (US)

(*) Notice: Subject to any disclaimer, the term of this patent is extended or adjusted under 35 U.S.C. 154(b) by 258 days.

(21) Appl. No.: 10/663,400

(22) Filed: Sep. 16, 2003

(51) Int. Cl.
*H04B 7/00* (2006.01)

(52) U.S. Cl. ............... 455/512; 455/404.1; 455/404.2; 455/446; 455/404.3; 455/456.4

(58) Field of Classification Search ............ 455/404.1, 455/451, 3, 404.2, 433, 445, 412, 509, 515, 455/561, 512, 446, 404.3, 456.4, 456; 370/338, 370/356, 401, 444; 379/37
See application file for complete search history.

(56) References Cited

U.S. PATENT DOCUMENTS

| | | | |
|---|---|---|---|
| 6,356,767 B1 * | 3/2002 | Froula | 455/512 |
| 6,542,491 B1 * | 4/2003 | Tari et al. | 370/338 |
| 2002/0176545 A1 * | 11/2002 | Schweitzer | 379/37 |
| 2004/0095954 A1 * | 5/2004 | Varney et al. | 370/444 |

OTHER PUBLICATIONS

NCS Wireless Priority Service (WPS), http://wps.ncs.gov, Apr. 25, 2003, 1 page.
Government Computer News (GCN), May 6, 2003. http://www.gen.com/vol1_no1/daily-updates/17456-1.html, 1 page.
How GETS Work, http://gets.ncs.gov/getswork.htm, Mar. 23, 2003, pp. 1-3.

* cited by examiner

*Primary Examiner*—Charles Appiah
*Assistant Examiner*—Randy Peaches

(57) ABSTRACT

A system [100] for facilitating wireless data communication may include an operations center [110] configured to implement access control rules [305] within an emergency zone [200] and an access device [130/310] configured to provide data access to a network [320] for user devices [140] and emergency devices [210]. The access device [130/310] may include a memory [340] configured to store the access control rules [305] that provide preferential access to the network for the emergency devices [210] within the emergency zone [200].

27 Claims, 5 Drawing Sheets

EMERGENCY SERVICES FOR WIRELESS DATA ACCESS NETWORKS

BACKGROUND OF THE INVENTION

1. Field of the Invention

The present invention relates generally to network management and, more particularly, to systems and methods for managing networks during emergencies.

2. Description of the Related Art

Recent events have shown that communications systems should be devoted primarily to emergency use in emergencies or cases of widespread disaster. Allowing normal civilian traffic to compete with that from emergency communication devices of emergency workers is likely to give "busy signals" and very poor service to the emergency workers. As used herein, the term "emergency devices" and its variants denote, generally, communication devices employed by emergency workers. Emergency workers may include, for example, police, fire fighting personnel, rescue workers, or other civil or military authorities.

For some time, the traditional, "wired" telephone system in the United States has employed features that allow government personnel to take precedence in use of the telephone system during emergencies. Such "emergency override" or "emergency access" features have at least been proposed to be added to cellular telephony (i.e., transmission of sound or voice information) systems.

Wireless data (i.e., non-voice) technology, however, is sufficiently different from that of traditional telephone or cellular telephone systems that new techniques must be created in order to provide such an emergency override feature for wireless data services.

Consequently, a need exists for techniques for implementing emergency overrides in wireless data systems.

SUMMARY OF THE INVENTION

Systems and methods consistent with the present invention address this and other needs by discriminating between emergency devices and other devices and providing preferential access to the emergency devices.

In accordance with the purpose of the invention as embodied and broadly described herein, a system for facilitating wireless data communication may include an operations center configured to implement access control rules within an emergency zone and an access device configured to provide preferential access to a network to emergency devices over non-emergency devices within the emergency zone based on the access control rules.

In another implementation consistent with the present invention, a method may include determining a need for an emergency zone in which wireless data access is to be restricted to emergency devices and associating one or more access devices with the emergency zone. An emergency message may be sent to the one or more access devices for wireless data access within the emergency zone to be restricted to the emergency devices.

In a further implementation consistent with the present invention, a method may include validating an emergency message and implementing access control rules based on the emergency message. Access by wireless data devices may be controlled to give preference to emergency devices based on the access control rules.

In yet another implementation consistent with the present invention, a computer-readable medium that stores instructions executable by one or more processors to perform a method for controlling data access in a wireless network may include instructions for differentiating between emergency devices and non-emergency devices and instructions for allowing wireless data access to the emergency devices in an emergency zone. The computer-readable medium also may include instructions for limiting wireless data access to the non-emergency devices in the emergency zone.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Rather, the scope of the invention is defined by the appended claims and equivalents.

Methods and systems consistent with the principles of the invention may discriminate between emergency devices and other devices and provide preferential wireless data access to the emergency devices. In one implementation, the wireless data access may be exclusive to the emergency devices within an emergency zone.

Exemplary System

Figure 1:
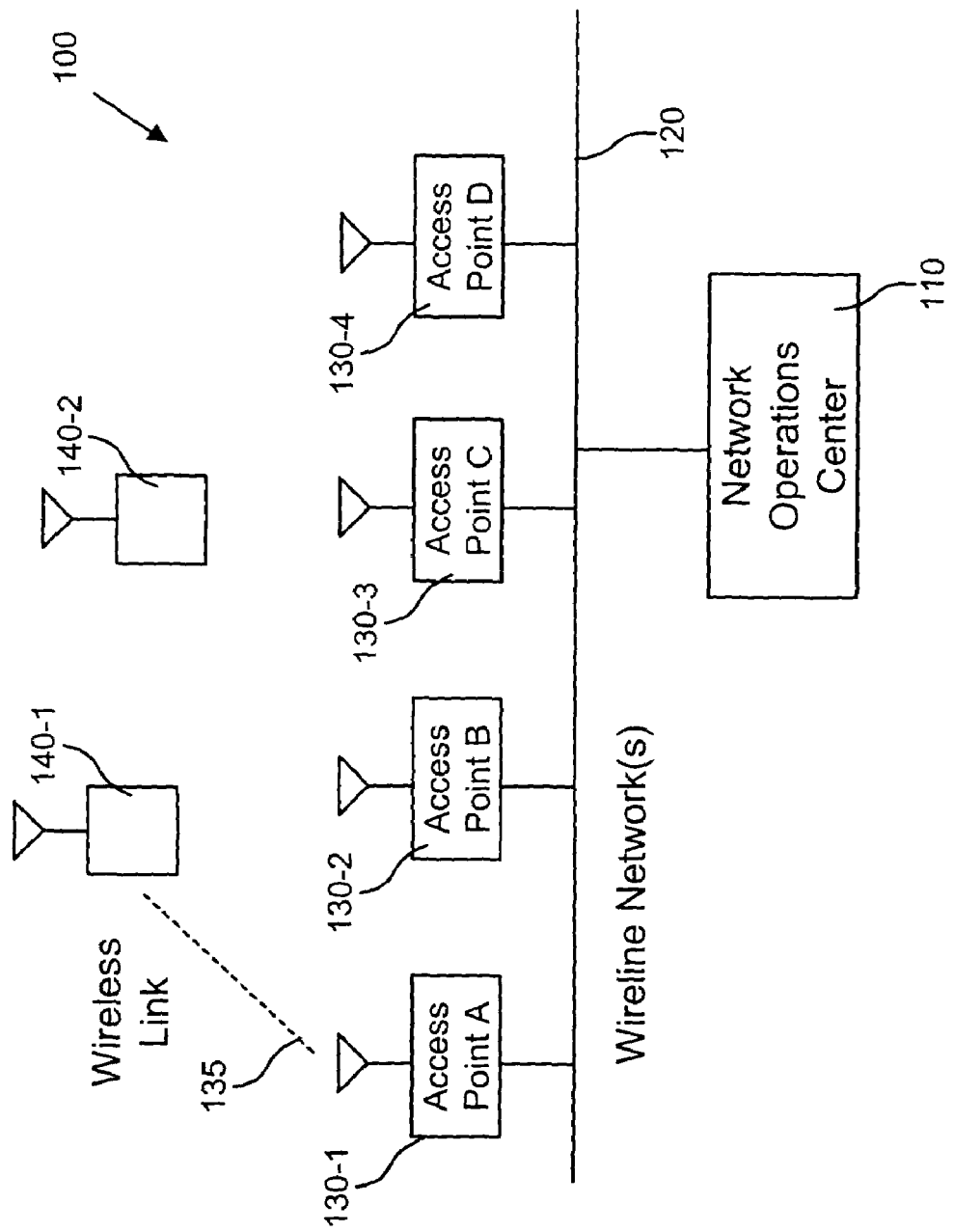
FIG. 1 illustrates an exemplary wireless data system in which the principles of the invention may be implemented.

FIG. 1 illustrates an exemplary wireless data system 100 in which the principles of the present invention may be implemented. System 100 may include a network operations center 110 and a number of wireless access points 130-1, 130-2, etc. (collectively "access points 130") connected via one or more wireline networks. It is also possible, though not illustrated in FIG. 1, that network operations center 110 and at least some of access points 130 may be connected via a wireless network. System 100 may also include a number of user devices 140-1, 140-2, etc. (collectively "user devices 140") that communicate with access points 130 via wireless links 135. System 100 may include a single wireless LAN/WAN within a building, a campus-wide wireless network, or metro-scale or national-scale architectures.

Network operations center 110 may coordinate communication between access points 130 and some other network, such as the Internet. Network operations center 110 may also supervise and/or administer access points 130, and may be able to alter the operation of access points 130 via changes in software, firmware, etc. Network operations center 110 may be operated by an Internet Service Provider (ISP) or other provider of access to wireless data services.

Wireline network 120 may be connected to access points 130 and may be configured to provide a given bandwidth of information to access points 130. Wireline network 120 may include one or more physical interfaces, such as Ethernet or optical fiber, that facilitate data transfer between access points 130 and another network, such as the Internet.

Access points 130 may be configured to communicate wirelessly via one or more wireless technologies, such as radio frequency (RF) or optical (e.g., infrared) communication. In one implementation, access points 130 may be configured to use IEEE 802.11 standard protocols (and/or a variant such as 802.11b, 802.11a, or 802.11g) for wireless communication. In other implementations, other wireless protocols, such as a Bluetooth®-related protocol, may be employed by access points 130. Access points 130 may also be configured to send and receive wireless, non-voice data via cellular telephone communication protocols, such as TDMA, CDMA, AMPS, etc. Further, each of access points 130 may have an associated effective area of coverage, depending upon the type of antenna employed. For example, an omnidirectional antenna may result in a roughly circular area of coverage, while a directional antenna may result in a cone or sector-shaped area.

User devices 140 may be configured (i.e., contain the necessary wireless hardware) to communicate wirelessly with access points 130. User devices 140 may include laptop computers, hand-held PDAs, an Internet-enabled cell phone, or other such devices capable of communicating wireless data. Examples of wireless data services that may be employed by user devices 140 include, but are not limited to, e-mail messaging, instant messaging via a central system (e.g., AOL® Instant Messenger™, Yahoo!® Messenger™, etc.), text messaging, alphanumeric (two-way) paging, web browsing (e.g., Internet or intranet, possibly via HTML, XML, etc.), file transferring, and any other known or later-developed scheme for communication using text or binary data. Although device 140-1 in FIG. 1 is shown connected to a single access point 130-1, in fact, it may experience simultaneous connections to a number of access points 130. Absent differentiated levels of service (e.g., "premium" verses "standard" levels of service), user devices 140 may be served in a non-discriminatory (e.g., first-come, first-served or round-robin) manner by access points 130.

Figure 2:
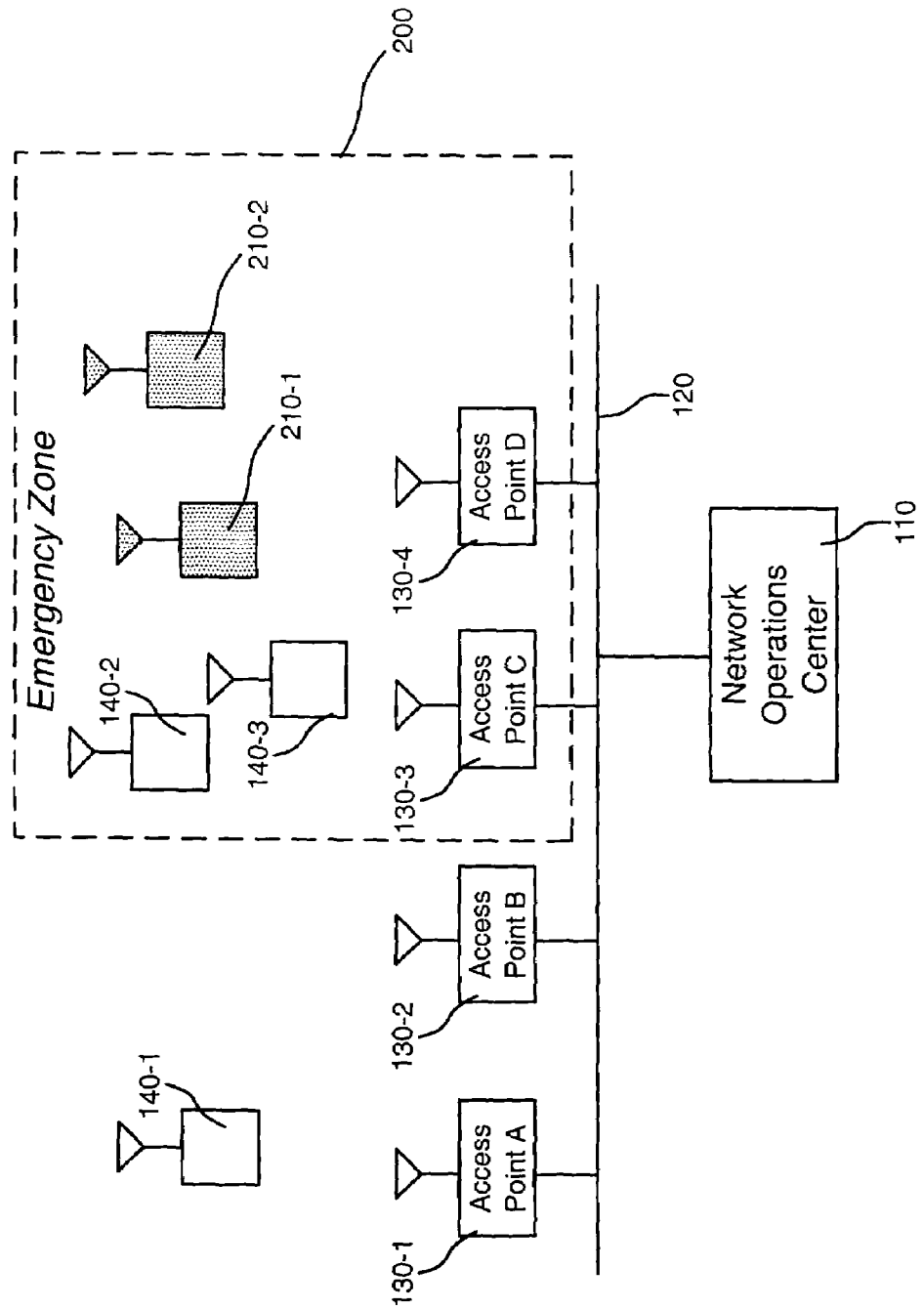
FIG. 2 illustrates the wireless data system of FIG. 1 during an emergency.

FIG. 2 illustrates wireless data system 100 during an emergency. An area covered by system 100 in which the emergency exists may be designated as an emergency zone 200. Although shown as a single zone encompassing part of system 100, those skilled in the art will appreciate that emergency zone 200 may encompass all of system 100, or that multiple emergency zones 200 may exist, covering discontiguous portions of system 100. As a concrete example, all of the access points over an area of some city blocks may be declared an emergency zone. In addition to user devices 140, one or more emergency devices 210-1, etc. (collectively "emergency devices 210") may be present in emergency zone 200.

In emergency zone 200, some portion of the wireless access network may be needed for emergency services (e.g., Internet or intranet access) by fire fighters, police, Federal security services or other emergency personnel using emergency devices 210. In FIG. 2, access points 130-3 and 130-4 fall within emergency zone 200, and their operation may be altered during the emergency as described herein. Other access points (e.g., access point 130-2) that may not be physically located within emergency zone 200 may have a coverage area that partially overlaps emergency zone 200. In such instances, a default rule (e.g., always include, never include, or include based on percentage overlap) will determine whether such "bordering" access points 130 will be included in emergency zone 200. It may be very desirable for emergency devices 210 within emergency zone 200 to receive all of the available capacity of access points 130-3 and 130-4 (or at least preferred access) during an emergency.

In operation, emergency devices 210 used by emergency service workers, such as firemen, police, medical personnel, and perhaps the military, may have exclusive use of wireless data system 100 (e.g., access points 130-3 and 130-4) within emergency zone 200. User devices 140 of other, normal (perhaps paying) users may be prevented from access to system 100 in emergency zone 200, once such a zone is put into effect. User devices 140 may not be allowed to use system 100 within emergency zone 200 until emergency zone 200 is restored to normal (i.e., non-emergency) service. User devices 140 of these displaced users may, in some implementations consistent with the principles of the invention, be allowed to use other parts of wireless data system 100 outside of emergency zone 200. Emergency devices 210 may, or may not, be able to access other portions of system 100 in a normal manner outside of emergency zone 200.

Exemplary Access Control Schemes

Figure 3:
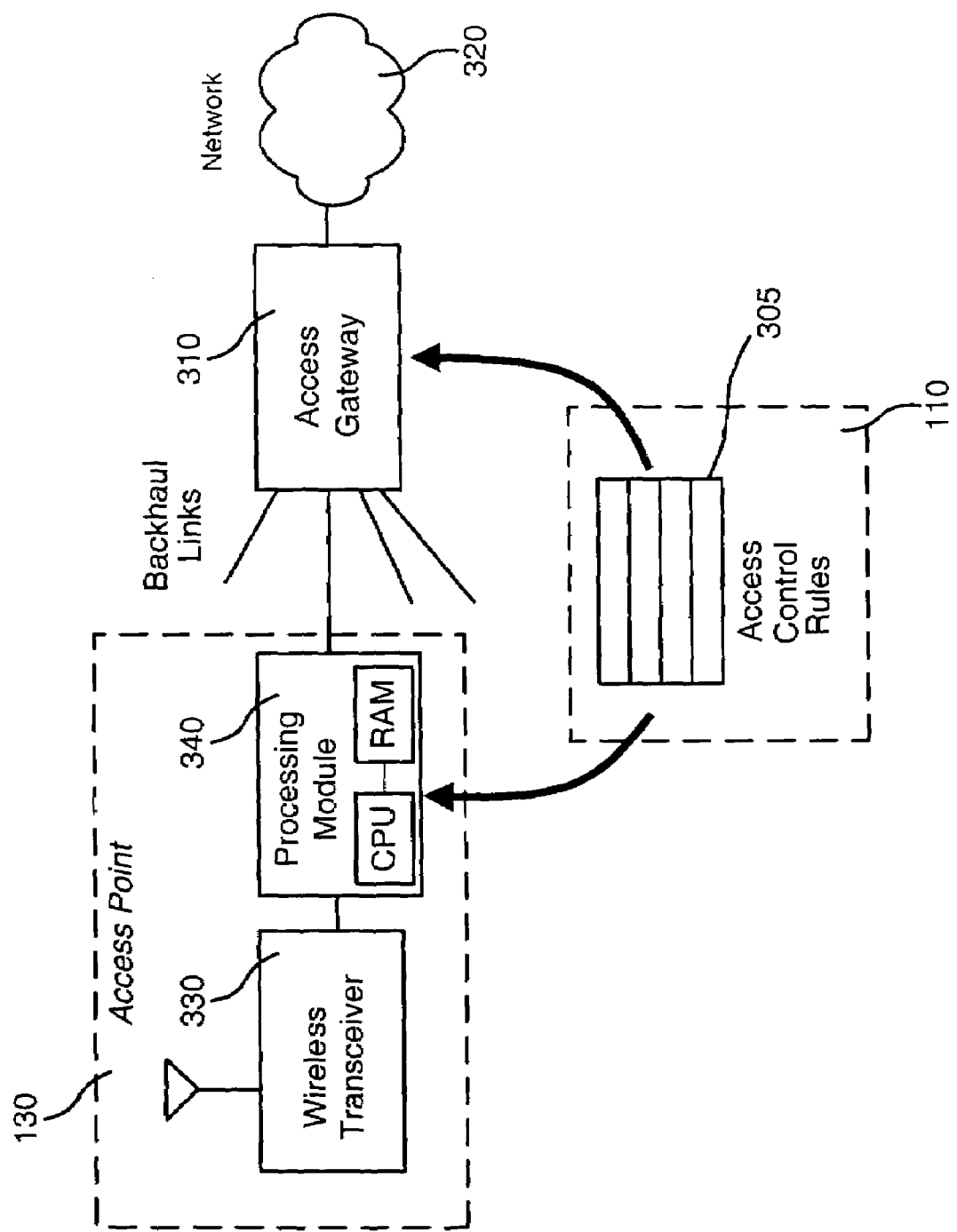
FIG. 3 illustrates a number of access control schemes consistent with the principles of the invention.

FIG. 3 schematically illustrates a number of access control schemes consistent with the principles of the invention. In the schemes illustrated in FIG. 3, one or more access point(s) 130 may communicate with a network 320 (e.g., the Internet, an intranet, etc.) via an access gateway 310. In some implementations consistent with the principles of the invention (not shown), access gateway 310 may be located in network operations center 110. In the implementation shown in FIG. 3, however, access gateway 310 may be located separate from network operations center 110 and may control traffic between access point(s) 130 and network 320.

Network operations center 110 may be configured to implement access control rules 305 in access point(s) 130 or access gateway 310 (or possibly a combination thereof) to control access to network 320. In one implementation, control rules 305 may be implemented by access point(s) 130 themselves. In another implementation, control rules 305 may be implemented by access gateway 310 that is "upstream" from access points 130 (e.g., in more or less centralized gateways where the wireless data traffic is channeled into, for example, a main metro-area network run by a service provider). These access point and gateway implementations are similar to each other, and any differences in implementation will be described in greater detail below.

Although FIG. 3 shows arrows from network operations center 110 to access point 130 and access gateway 310, this does not necessarily mean that network operations center 110 transfers access control rules 305 to access point 130 and access gateway 310 each time that access to network 320 needs to be controlled. Rather, network operations center 110 may, during an emergency, just trigger access control rules 305 that are already resident in access point(s) 130 or access gateway 310. Thus, FIG. 3 is intended to convey that network operations center 110 may implement access control rules 305 in access point 130 and/or access gateway 310, and should not limit the manner of implementation of these rules 305.

Many formats for access control rules 305 are possible, and many techniques for implementing access control rules 305 exist. Whenever a device (e.g., access point 130 or gateway 310) is ready to forward information (e.g., a data packet), it may check certain fields in the packet content against access control rules 305. Common fields used for such access control may include source and/or destination addresses (e.g., IP addresses) for the information. In some implementations, it may be very desirable to check the requesting devices' (e.g., devices 140 or 210) Medium Access Control (MAC) address, which is a globally-unique IEEE 802.2 address used for a given device's wireless transceiver. If this MAC address is prohibited by a rule in access control rules 305 (e.g., the address does not correspond to an emergency device 210), the packet from such device may be discarded. Alternatively, the packet may be processed normally if sent from an emergency device 210. By proper configuration of access control rules 305, such techniques may be used to discard all messages from normal user devices 140, and provide priority service to those from emergency devices 210 used by emergency workers.

There are a number of ways in which such rule sets 305 may be implemented. Although a few concrete examples are provided herein, the principles of the invention encompass other known ways of enforcing rules. For example, one way is to require all emergency devices 210 to have special kinds of MAC addresses. For IEEE 802.2 MAC addresses, one field lists the company that made the device. One value from this field may be used to designate emergency devices 210, no matter which company manufactures them. Another way to enforce rules 305 is to maintain a wide-area (e.g., city-wide) list of all MAC addresses of emergency devices 210. This address list scheme does not require any special use of fields in MAC addresses, but an up-to-date list of such addresses may need to be maintained. A wireless data service provider, however, may already maintain a complete list of all acceptable MAC addresses of its customers, to help combat fraudulent theft of service.

Another scheme to enforce rules 305 may be to require all users to "log in" (i.e., provide authentication information such as an identifier and/or password) to system 100, either via human interaction or via some automated protocols such as Dynamic Host Configuration Protocol (DHCP), or a combination of the two. During this authentication process, device 210 (and/or its human operator) can supply sufficient information to claim emergency priority, and the device identifier can then be looked up in, for example, a designated "emergency" table. In fact, such a scheme may be implemented in a straightforward manner by an "emergency password" that emergency personnel may enter to gain priority access to system 100. Other schemes are possible, including pre-assigned identifiers (e.g., codes or alphanumeric strings) that uniquely identify not only the type of device (i.e., an emergency device 210), but also the user of the device.

Any of the access control schemes using rules 305 described herein may be implemented via instructions and/or programs stored on computer-readable media in access point(s) 130 or access gateway 310. Once a set of access rules 305 is in operation, it will have the effect of "choking off" all user traffic from user devices 140, while allowing traffic to/from emergency devices 210 through the affected access points 130 and/or gateways 310 serving emergency zone 200. When the emergency has ended, network operations center 110 may issue new rule sets and/or commands that undo this effect and restore system 100 to normal service.

Access Control in Gateways:

Because a given (metro) gateway 310 may cover a large number of access points 130, it is possible that only some subset of its covered access points 130 may be associated with a given emergency zone 200. Access control rules 305 may be stored in a memory (not shown) of gateway 310. Thus, access control rules 305 introduced into gateway(s) 310 should specify two different items: 1) the access control scheme (i.e., the "substance" of access control rules 305), and 2) the affected access points 130 (i.e., the "targets" of access control rules 305). Gateway(s) 310 may then discard all normal user packets from the affected (i.e., associated with emergency zone 200) access points 130, but may treat all other types of traffic normally.

Access Control in Access Points:

Access point 130 may include a wireless transceiver 330 and a processing module 340 (e.g., CPU plus memory, such as RAM). Using access control rules 305, processing module 340 may limit access of user devices 140 to network 320 via wireless transceiver 330. Various schemes may be implemented by processing module 340 to implement access control rules 305.

In one implementation, processing module 340 may allow any form of packet communication across the wireless transceiver 330. Processing module 340 may only discard packets once they have entered access point 130 via wireless link 135.

In another implementation, access point 130 refuses to allow user device 140 to transmit a packet across wireless link 135. This scheme may not produce a significantly better effect than discarding data packets at access point 130, but it does keep wireless link 135 clear of potential interference from normal user devices 140 that are busy (e.g., continuously trying to connect to the Internet to find out what is going on). In such an implementation, network operations center 110 may install a list of approved MAC addresses in access point 130 that contains the allowed emergency service devices 210. Alternatively access point 130 may be provided with rules for allowable MAC addresses (e.g., addresses with a field set to some known value, etc.). Whenever access point 130 is engaging in a typical communications protocol "handshake" for packet transfer across wireless link 135, processing unit 340 may consult this list or table for acceptable emergency devices 210.

For those systems 100 that use a 4-way handshake (e.g., RTS-CTS-DATA-ACK) including a Request to Send (RTS) message, and that include the originating device identifier in the RTS, the following scheme may be used to deny packets from wireless link 135. User device 140 (or emergency device 210) may send an RTS message that includes its device identifier. Access point 130 may compare this device identifier against its list of approved MAC addresses. If the identifier is not in this list, access point 130 may ignore the RTS. This prevents the corresponding data packet from being sent by device 140, because device 140 will not receive the Clear to Send (CTS) message corresponding to the ignored RTS. Otherwise, access point 130 may process the request normally—send a CTS message, accept the wireless data from device 210, and send an Acknowledgment (ACK) message to complete the handshake.

For those systems 100 that use only a two-way handshake (i.e., that do not have the RTS/CTS part of the 4-way protocol), the following scheme may be used to deny packets. User device 140 (or emergency device 210) may send a data frame that includes its device identifier. Access point 130 may compare this device identifier against its list of approved MAC addresses. If the identifier is not in this list, access point 130 may ignore the data. Otherwise access point 130 may process the wireless data normally by sending a return ACK message. In either of the 4-way or 2-way handshake cases, the effect is to ignore data frames sent by non-emergency devices 140. The IEEE 802.11 standard, for example, mandates that an unsuccessful transmitting device 140 go into a "back off" mode where it remains silent for a random time interval, and the interval may increase with the number of failed attempts to transmit the frame. In effect, this back off mode tends to leave more of wireless channel 135 "clear" and available for use by emergency service devices 210.

As previously described, the list/table of approved MAC addresses in either access point 130 or access gateway 310 may be adjusted as necessary by commands from network operations center 110. Such adjustment may include the removal of this list when the emergency has ended in any zone 200, so that wireless system 100 may return to normal operation.

Exemplary Access Control Processing

Figure 4:
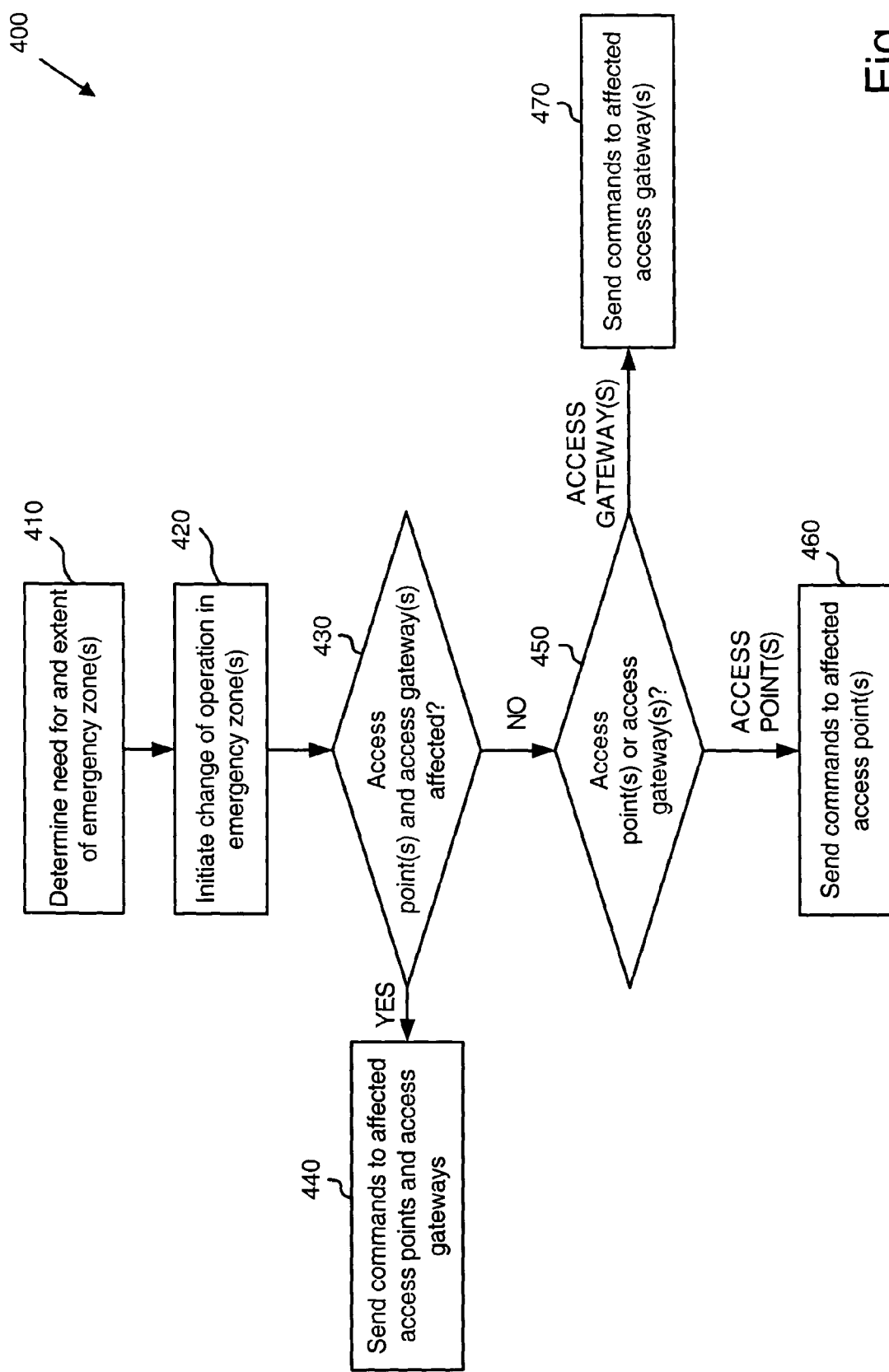
FIG. 4 illustrates an exemplary method of initiating access control in an emergency zone in accordance with implementations of the present invention.

FIG. 4 illustrates an exemplary method 400 of initiating access control in an emergency zone 200. Method 400 may be performed, for example, by network operations center 110 and/or network operators associated therewith. Processing may begin with network operators determining that one or more emergency zone(s) 200 need to be put into effect [act 410]. In addition to such a determination, the extent of emergency zone(s) 200 (i.e., those access point(s) 130 or gateways(s) 310 that should be associated with emergency zone(s) 200) may also be determined. Those skilled in the art will appreciate that various schemes for associating access point(s) 130 and/or gateways(s) 310 with emergency zone(s) 200 may be used, including predetermined (e.g., lists of devices that correspond to geographical areas, such as city blocks), ad hoc (e.g., determined by a large concentration of emergency devices 210), and/or phased-in (e.g., varying with time and/or geography) approaches.

Processing may continue by the network operators giving commands at one or more network operations centers 110 that these access point(s) 130 and/or gateways(s) 310 should be associated with an emergency zone 200 [act 420]. If emergency zone 200 is associated with one or more access point(s) 130 and one or more gateway(s) 310 [act 430], network operation center(s) 110 may send commands to all the affected access points 130 and all of the affected access gateways 310 [act 440], which contain the access rules/lists. If, on the other hand, only access points or only access gateways 310 are to be associated with emergency zone 200 [act 450], network operation center(s) 110 may send commands to all the affected access point(s) 130 [act 460] or to all of the affected access gateway(s) 310 [act 470]. In either event, the control messages may be protected by cryptographic measures to ensure both the privacy and the integrity of the control messages. Such encryption may also provide a measure of confidence that such commands are properly authorized.

Figure 5:
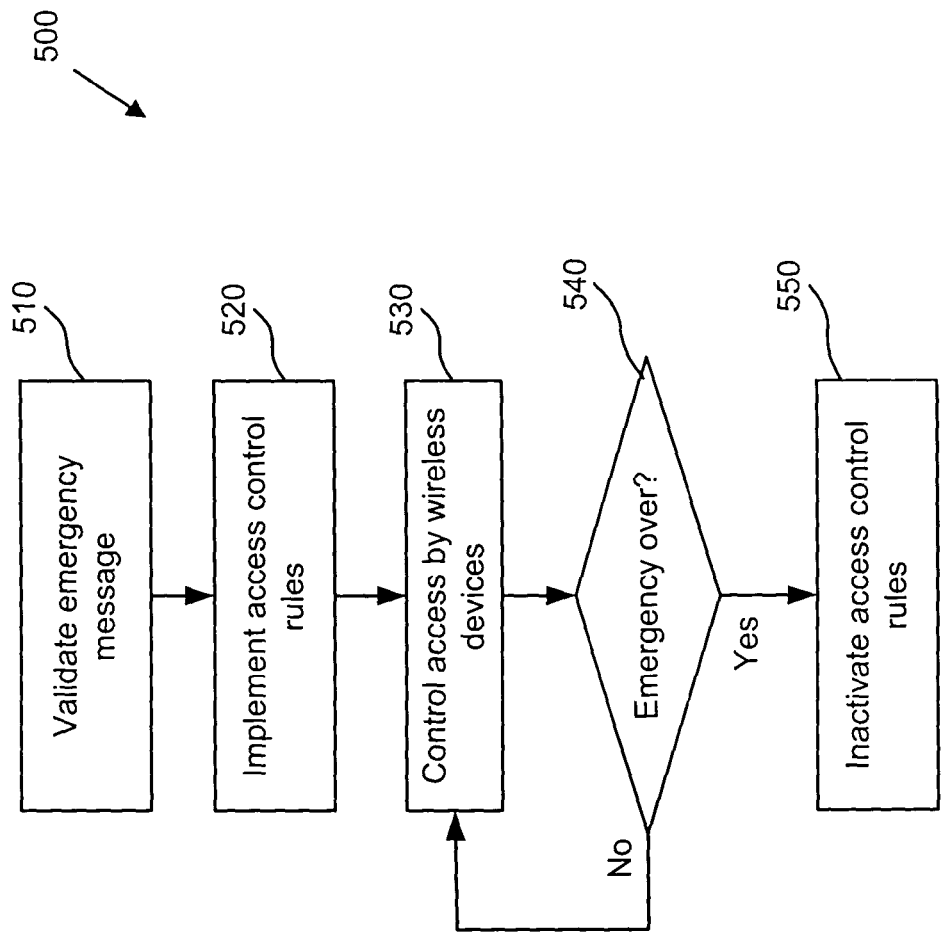
FIG. 5 illustrates an exemplary method of implementing access control in an emergency zone in accordance with implementations of the present invention.

FIG. 5 illustrates an exemplary method 500 of implementing access control in an emergency zone 200 in accordance with implementations of the present invention. When a device (e.g., access point 130 and/or gateway 310) receives an emergency message from network operations center 110, it may validate the message [act 510]. The authentication, integrity, etc. of the emergency message may be verified at this point. For example, the emergency message may be decrypted using an emergency decryption key resident in access point 130 and/or gateway 310.

When the emergency message has been verified, access control rules 305 may be implemented [act 520]. In one implementation, access point 130 and/or gateway 310 may extract access control rules 305 from this message and install them into local memory (e.g., in processing module 340). Such local memory may be RAM, and/or non-volatile memory (such as flash memory) so rules 305 can survive across power outages. In another implementation, rules 305 may already be resident in access point 130 and/or gateway 310, and the emergency message may provide one or more parameters to initialize and/or specify the operation of access control rules 305 (e.g., duration such as an automatic "sunset" period, a phase-in time, whether currently operating user devices 140 will be immediately disconnected, etc.).

Once access control rules 305 have been established, these rules 305 may control access to network 320 for user devices 140 and emergency devices 210 [act 530]. Such access control may filter wireless data packets according to any of the above-described schemes. For example, access may be controlled based on a source/destination IP address, a MAC address, manual or automatic authentication schemes, etc.

Access point 130 and/or gateway 310 may continue such filtering until it receives subsequent commands [act 540]. Such subsequent commands may, for example, alter access control rules 305 in effect, in which case act 530 would continue under the altered rules 305. For example, different sets of control rules 305 may be used for early-stage, mid-stage, and late-stage emergencies. If the emergency is over, a "rescind emergency" message may be received, and access control rules may be removed and/or inactivated [act 550]. In this manner, wireless data service may revert to normal for user devices 140 and emergency devices 210. In some implementations, for example when user devices 140 are in a "backed off," inactive mode for wireless data communications, access point 130 and/or gateway 310 may send an "all clear" or other initialization signal that lets devices 140 know that data communication is once again available.

CONCLUSION

Systems and methods consistent with the present invention may discriminate between emergency devices and other devices and provide preferential wireless data access to the emergency devices during an emergency.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although preventing user devices 140 from accessing system 100 has been disclosed, other access schemes are possible that are more graduated. For example, emergency devices 210 may be given (perhaps much higher) priority in emergency zone 200 than user devices 140, but user devices 140 need not be completely denied access to system 100. Further, various observations (e.g., total bandwidth available in view of the bandwidth used by emergency devices 210) may be used to allow some access by user devices 140 during the emergency. For example, if only a handful of emergency devices 210 are vying for system resources, some user devices 140 may be allowed access by rules 305. In one implementation consistent with the principles of the invention, some user devices 140 (e.g., those on a "premium" service plan) may retain limited wireless data capability (perhaps deferring to emergency devices 210) during an emergency, while other user devices (e.g., those on a "standard" or "minimum" service plan) may completely lose wireless data access during the emergency.

Further, although wireless data (e.g., text, pictures, etc.) has been defined as being "non-voice" herein, such wireless data may include Voice over IP (VoIP) data, even though such data may be used to carry sound. "Wireless data" as used herein encompasses text or binary data (even if such data is used to carry voice), but may exclude typical cellular-telephone-originated voice calls. VoIP wireless data, for example, may be viewed as "packetized" data, because it may be sent in individual packets with header information on each packet. Such packetized data may be conceptually distinguished from circuit-oriented services, such as calls from cell phones.

Also, while series of acts have been described with regard to FIGS. 4 and 5, the order of the acts can be varied in other implementations consistent with the present invention, and non-dependent acts can be implemented in parallel. Further, the acts in these figures may be implemented as instructions, or groups of instructions, in a computer-readable medium, such as an optical, magnetic, solid-state, integrated circuit, or other type of typical medium read by processors. For example, operation center 110, access point 130, and/or gateway 310 may include a processor configured to execute such instructions on the computer-readable medium to perform the acts in FIGS. 4 and 5.

No element, act, or instruction used in the description of the present invention should be construed as critical or essential to the invention unless explicitly described as such. As used herein, the article "a" is intended to include one or more items. Where only one item is intended, the term "one" or similar language is used. The scope of the invention is not limited to the foregoing description, and is instead defined by the appended claims and their equivalents.

What is claimed is:

1. A system for facilitating wireless data communication, comprising:
    a non-wireless operations center configured to implement access control rules within an emergency zone;
    a wireless access device different from, and connected by wireline to, the operations center, the wireless access device configured to provide preferential access to a network to emergency devices over non-emergency devices within the emergency zone based on the access control rules;
    wherein the emergency zone has access points within and outside of the zone where certain access points outside of the zone have coverage area partially overlapping the zone; and
    wherein one of the access control rules is a default rule to either always include the certain access points, never include the certain access points or include the certain access points based on extent of the overlapping.

2. The system of claim 1, wherein the operations center is configured to transit the access control rules to the access device.

3. The system of claim 1, wherein the access control rules reside in a memory of the access device, and
    wherein the operations center is configured to send an emergency message that activates the access control rules.

4. The system of claim 1, wherein the access device includes a wireless access point configured to wirelessly communicate with the non-emergency devices and the emergency devices.

5. The system of claim 4, wherein the wireless access point includes:
    a processor configured to filter wireless data based on the access control rules, and
    a wireless transceiver connected to the processor and configured to send and receive wireless data.

6. The system of claim 1, wherein the wireless access device includes:
    at least one wireless access point configured to wirelessly communicate with the non-emergency devices and the emergency devices, and
    a gateway connected between the at least one wireless access point and the network and configured to control access to the network by data from the at least one wireless access point.

7. A method, comprising:
    determining a need for an emergency zone in which wireless data access is to be restricted to emergency devices wherein the emergency zone has access points within and outside of the zone where certain access points outside of the zone have coverage area partially overlapping the zone;
    applying a default rule to either always include the certain access points, never include the certain access points or include the certain access points based on extent of the overlapping;
    associating one or more access devices with the emergency zone;
    sending an emergency message to the one or more access devices for wireless data access within the emergency zone to be restricted to the emergency devices, and
    altering the emergency message responsive to the development stage of the emergency.

8. The method of claim 7, wherein the associating includes:
    designating, by a network operator, a set of access devices as corresponding to the emergency zone.

9. The method of claim 7, wherein the emergency message includes access control rules for storage in and implementation by the one or more access devices.

10. The method of claim 7, wherein the emergency message includes one or more commands to activate access control rules that reside in the one or more access devices.

11. The method of claim 7, sending an emergency message includes:
    sending the emergency message to one or more wireless access points that wirelessly communicate with the emergency devices.

12. The method of claim 7, sending an emergency message includes:
    sending the emergency message to one or more gateway devices that control data traffic from one or more wireless access points.

13. A method, comprising:
    validating an emergency message;
    implementing access control rules based on the emergency message;
    establishing an emergency zone having access points within and outside of the zone where certain access points outside of the zone have coverage area partially overlapping the zone;
    establishing one of the access control rules as a default rule to either always include the certain access points, never include the certain access points or include the certain access points based on extent of the overlapping;

controlling access by wireless data devices to give preference to emergency devices based on the access control rules, and altering the emergency message responsive to the development stage of the emergency.

14. The method of claim 13, wherein the validating includes:

cryptographically validating the emergency message using an emergency cryptographic key.

15. The method of claim 13, wherein the implementing includes:

extracting the access control rules from the emergency message, and installing the access control rules.

16. The method of claim 13, wherein the implementing includes:

providing parameters from the emergency message to installed access control rules.

17. The method of claim 13, wherein the controlling access includes:

limiting wireless data access to emergency devices based on a set of addresses.

18. The method of claim 17, wherein the set of addresses includes media access control (MAC) addresses.

19. The method of claim 17, wherein the set of addresses includes Internet protocol (IP) addresses.

20. The method of claim 17, wherein the limiting wireless data access includes selectively refusing to complete a communication protocol handshake.

21. The method of claim 13, wherein the controlling access includes:

limiting wireless data access to emergency devices based on authentication information provided by the emergency devices.

22. A computer-readable medium that stores instructions executable by one or more processors to perform a method for controlling data access in a wireless network, comprising:

instructions for establishing an emergency zone having access points within and outside of the zone where certain access points outside of the zone have coverage area partially overlapping the zone;

instructions for establishing a default rule to either always include the certain access points, never include the certain access points or include the certain access points based on extent of the overlapping; and instructions for utilizing both the access points within the zone and, responsive to operation of the default rule, the certain access points, for:

(1) differentiating between emergency devices and non-emergency devices in the emergency zone;

(2) allowing wireless data access to the emergency devices in the emergency zone; and (3) limiting wireless data access to the non-emergency devices in the emergency zone.

23. The computer-readable medium of claim 22, wherein the instructions for differentiating include:

instructions for classifying data from a wireless device based on media access control (MAC) addresses, Internet protocol (IP) addresses, or authentication information.

24. The computer-readable medium of claim 22, wherein the instructions for limiting wireless data access include:

instructions for denying wireless data access to the non-emergency devices in the emergency zone.

25. A system for providing emergency wireless data access within an emergency zone in a network, comprising:

wireless access point means for receiving at access points communication requests that were initiated by wireless devices wherein the emergency zone has the access points within and outside of the zone where certain of the access points outside of the zone have coverage area partially overlapping the zone;

non-wireless operations center means, different from, and connected by wireline to, the wireless access point means, for storing access control rules for controlling wireless data access during an emergency wherein one of the access control rules is a default rule to either always include the certain access points, never include the certain access points or include the certain access points based on extent of the overlapping; and means for selectively processing the communication requests in accordance with the access control rules during the emergency.

26. The system of claim 25, wherein the means for receiving includes:

means for receiving wireless data from the wireless devices.

27. A method for controlling data access in a wireless network, comprising:

establishing an emergency zone having access points within and outside of the zone where certain access points outside of the zone have coverage area partially overlapping the zone;

establishing a default rule to either always include the certain access points, never include the certain access points or include the certain access points based on extent of the overlapping; and utilizing both the access points within the zone and, responsive to operation of the default rule, the certain access points, for:

differentiating between emergency devices and non-emergency devices in the emergency zone during an emergency;

allowing wireless data access to the emergency devices in the emergency zone during the emergency; and limiting wireless data access to the non-emergency devices in the emergency zone during the emergency.

* * * * *